United States Patent
Adam

(10) Patent No.: US 6,910,156 B2
(45) Date of Patent: Jun. 21, 2005

(54) METHOD AND SYSTEM FOR DIAGNOSING A TECHNICAL INSTALLATION

(75) Inventor: Gottfried Adam, Neunkirchen-Seelscheid (DE)

(73) Assignee: Siemens Aktiengesellschaft, Munich (DE)

( * ) Notice: Subject to any disclaimer, the term of this patent is extended or adjusted under 35 U.S.C. 154(b) by 523 days.

(21) Appl. No.: 10/058,525

(22) Filed: Jan. 28, 2002

(65) Prior Publication Data

US 2002/0083372 A1 Jun. 27, 2002

Related U.S. Application Data

(63) Continuation of application No. PCT/EP00/06898, filed on Jul. 19, 2000.

(30) Foreign Application Priority Data

Jul. 28, 1999 (EP) .............................................. 99114790

(51) Int. Cl.[7] .............................................. G06F 11/00
(52) U.S. Cl. ........................... 714/30; 706/914; 714/37; 701/100; 701/106; 376/216
(58) Field of Search .............................. 714/26, 27, 49, 714/30, 37, 46; 73/1.28; 706/51, 914; 376/216, 245; 701/100, 106

(56) References Cited

U.S. PATENT DOCUMENTS

| | | | | |
|---|---|---|---|---|
| 4,552,718 A | | 11/1985 | Impink, Jr. et al. | |
| 5,127,005 A | * | 6/1992 | Oda et al. | 714/26 |
| 5,272,704 A | * | 12/1993 | Tong et al. | 714/26 |
| 5,369,756 A | | 11/1994 | Imura et al. | |
| 5,519,740 A | * | 5/1996 | Chao | 376/216 |
| 5,587,930 A | * | 12/1996 | Hori et al. | 702/185 |
| 5,625,574 A | * | 4/1997 | Griffiths et al. | 702/183 |
| 5,870,768 A | * | 2/1999 | Hekmatpour | 715/501.1 |
| 5,914,875 A | * | 6/1999 | Monta et al. | 700/79 |
| 6,298,308 B1 | * | 10/2001 | Reid et al. | 702/56 |

FOREIGN PATENT DOCUMENTS

| | | |
|---|---|---|
| EP | 0 413 512 A2 | 2/1991 |
| EP | 0 424 869 A1 | 5/1991 |
| WO | WO 89/03087 | 4/1989 |
| WO | WO 96/20439 | 7/1996 |

* cited by examiner

*Primary Examiner*—Robert Beausoliel
*Assistant Examiner*—Aaron D Matthew
(74) *Attorney, Agent, or Firm*—Laurence A. Greenberg; Werner H. Stemer; Ralph E. Locher

(57) ABSTRACT

A diagnostic method and system for a technical installation establish the cause of a fault event. A reliable, flexible and simple possible way of diagnosing an installation is provided by placing state variables that characterize an operating state of the technical installation in a dependency tree and establishing a fault path in the dependency tree by linking change directions of diagnostic parameters contained in the dependency tree.

9 Claims, 6 Drawing Sheets

METHOD AND SYSTEM FOR DIAGNOSING A TECHNICAL INSTALLATION

CROSS-REFERENCE TO RELATED APPLICATION

This application is a continuation of copending International Application No. PCT/EP00/06898, filed Jul. 19, 2000, which designated the United States.

BACKGROUND OF THE INVENTION

Field of the Invention

The invention relates to a diagnostic method for a technical installation for establishing the cause of a fault event. The invention also relates to a corresponding diagnostic system for a technical installation.

A diagnostic system for a turbine installation is described in an article entitled "Online-Turbinendiagnose spart Brennstoff und senkt Instandhaltungskosten" [Online Turbine Diagnosis Saves Fuel and Reduces Maintenance Cost] by W. Zörner, in Siemens Power Journal, Volume 1 1993, pages 14–17. The diagnostic system is constructed modularly. The construction is based on the functional groups of turbine installations. A high information density is achieved due to comprehensive data acquisition and conditioning. Not only are individual measured values displayed and deviations from a desired state detected, but online diagnoses about the state of the installation are carried out. Changes which may be in the offing are detected in good time through the use of continual monitoring of the measured values of relevant components and operating states of the machines. The diagnosis is initiated in an event-oriented manner, that is to say automatically when measured values exceed their permissible range of scatter, which is long before a hazard report. Furthermore, that diagnosis can also be stimulated as a function of time or for manual evaluation of a problem area. An expert system belonging to the central diagnosis automatically reports any irregularity during online operation. In that case, the modules are either more or less algorithmically oriented, depending on their respective function, or else they are knowledge-based, depending on complexity. One characteristic of the system is the processing of uncertain knowledge. There, various methods of formulation are used, which extend from mathematically oriented probabilistic models as far as fuzzy logic. Assessments (confidence factors) which are assigned to the diagnoses permit a statement about the level of confidence in the conclusion being drawn. In order to provide the assessment, all diagnoses are sorted and output in accordance with descending confidence factors. Likewise, a list is compiled of the diagnoses which can be ruled out with high probability.

A description of the same diagnostic system is given by an article entitled "Einsatz eines Diagnosesystems zur Optimierung des Betriebs von Turbinenanlagen" [The Use of a Diagnostic System to Optimize the Operation of Turbine Installations] by W. Zörner, in VDI Reports 1092, VDI-Verlag Düsseldorf 1993. There, using the example of a condenser in a steam turbine installation, a description is given of how a diagnostic result is obtained through logical combinations from measured values of measured variables such as condenser pressure, generator output or air leakage mass flow.

In the case of complex relationships, diagnoses based on logical combinations become incomprehensible and can then no longer be verified in terms of their freedom from logical contradictions. In addition, the maintenance of rule mechanisms linked in that way in the event of changes to the installation is very complicated. In addition, other diagnostic tools such as neural networks or fuzzy logic are very complicated and do not always lead to unambiguous statements.

SUMMARY OF THE INVENTION

It is accordingly an object of the invention to provide a diagnostic method and a diagnostic system for a technical installation for establishing a cause of a fault event, which overcome the hereinafore-mentioned disadvantages of the heretofore-known methods and systems of this general type and in which an adequately fast and reliable statement about the cause can be made, even in the case of a very complex construction of the technical installation.

With the foregoing and other objects in view there is provided, in accordance with the invention, a diagnostic method for a technical installation for determining a cause of a fault event described by a fault state variable. The method comprises establishing an operating state of the installation defined by state variables, by determining diagnostic parameters each characterizing one of the state variables. A dependency tree containing at least some of the diagnostic parameters is compiled by configuring the dependency tree with hierarchical levels numbered Hn, where n=1, 2, . . . . The hierarchical levels include a first hierarchical level containing a fault diagnostic parameter characterizing a fault state variable, a second hierarchical level, following the first hierarchical level, and containing diagnostic parameters defining state variables acting directly on the fault state variable, and a hierarchical level Hn+1, following a given hierarchical level Hn, and containing diagnostic parameters defining state variables acting directly on the state variables characterized by the diagnostic parameters at the given hierarchical level Hn. A fault path in the dependency tree is determined starting from the fault diagnostic parameter, by identifying a responsible diagnostic parameter at the hierarchical level Hn+1 depending on a magnitude or a change direction of a diagnostic parameter at the given hierarchical level Hn. A cause of the fault is inferred from the responsible diagnostic parameter identified in the identifying step at a last one of the hierarchical levels.

Therefore, in this diagnostic method, the cause of the fault event is established through a dependency tree having hierarchical levels. Each hierarchical level contains diagnostic parameters, which characterize measured or calculated state variables of the technical installation. In this case, one hierarchical level is connected downstream of another hierarchical level that contains diagnostic parameters on which the state variables of the one hierarchical level connected downstream (described by its respective diagnostic parameters) act. In this case, parallel hierarchical levels can occur, that is to say a hierarchical level Hn+1 is connected downstream of a diagnostic parameter at a hierarchical level Hn and has diagnostic parameters of state variables which act directly on this diagnostic parameter (or its state variable). A different diagnostic parameter at the hierarchical level Hn can be assigned a different hierarchical level Hn+1, parallel to the first hierarchical level Hn+1, containing a different set of state variables (or their diagnostic parameters) that act on the state variable of the diagnostic parameter at the hierarchical level Hn. Therefore, the technical dependencies in the technical installation are expressed clearly and unambiguously with such a tree-like structure. In a further step, the magnitude or change direction of the fault diagnostic parameter contained at the first hierarchical level is considered and, from this, that diagnostic parameter or those diagnostic parameters at the second hierarchical level are identified as responsible diagnostic parameters for the magnitude or change direction of the fault diagnostic parameter. The responsible diagnostic parameters at the further hierarchical levels are then successively identified iteratively. The cause of the fault event can be inferred with sufficient certainty by identifying the responsible diagnostic parameter at a last hierarchical level. This procedure for the diagnosis can be carried out sufficiently quickly, so that consequential damage arising from the fault event can be avoided through the use of an appropriate reaction to the cause. Furthermore, the diagnostic method is so comprehensible and flexible that even changes in the technical installation can be included in a straightforward manner in the diagnostic method.

In accordance with another mode of the invention, for each diagnostic parameter at an upstream hierarchical level Hn, each diagnostic parameter at a hierarchical level Hn+1 is allocated a rising, falling or constant change direction as a function of a predefined change direction of the respective diagnostic parameter at the hierarchical level Hn. The fault path is established by using agreement between measured change directions of the diagnostic parameters and the allocated change directions. Each diagnostic parameter can therefore assume three change properties: falling, rising or constant. If one of these change properties is predefined for a diagnostic parameter, the change properties then assumed by the following hierarchical level Hn+1 are determined in accordance with a known technical dependency (which is obtained, for example, through the use of an expert system). Each diagnostic parameter therefore has a defined link, through its change property, with the diagnostic parameters at the following hierarchical level. If the measured change directions of the diagnostic parameters are then compared with the allocated change directions, the responsible diagnostic parameters and therefore the fault path can be obtained quickly and easily.

One great advantage in this case is the recursive analysis, that is to say it is always only necessary to consider the measured values of two successive hierarchical levels in order to come to the next hierarchical level, irrespective of the depth at which one is located in the dependency tree. In addition, different experts can operate independently of one another in the compilation of the dependency tree and in the setting up of the allocated change directions. The assessment of the reliability of diagnostic statements is additionally possible in a simple and verifiable manner. If it is assumed that the dependency tree and the allocated change directions are well defined for specific operating states (for example on-load operation of a turbine), the frequency of contradictions, that is to say the number of process variables which, after the undesired state has been entered, do not change in the predefined direction, is a measure of the credibility of the diagnosis. The number of process variables that conform with the allocated change directions, weighting factors and the time duration of the fault process, can be included in a weighting algorithm for the fuzzy variable.

In accordance with a further mode of the invention, the technical installation is preferably a turbine installation. It is further preferred for the technical installation to be a gas turbine installation, a steam turbine installation or a combined gas and steam turbine installation. It is precisely in such a turbine installation that the diagnostic method can be used advantageously, since a simple compilation of the dependency tree is made possible through the use of sequential processes determined by the routing of the respective turbine-driving medium. In addition, it is precisely in the case of turbine installations that it is absolutely necessary to have available a fast and reliable diagnostic system for the early detection of the causes of a fault event.

In accordance with an added mode of the invention, the cause is preferably established by utilizing a wide area network, in particular the Internet. This permits remote diagnosis of the technical installation. For instance, a diagnosis in a power plant can also be carried out by the power plant manufacturer, under certain circumstances operating at a great distance.

With the objects of the invention in view, there is also provided a diagnostic system for a technical installation for determining a cause of a fault event described by a fault state variable. The diagnostic system is configured to establish an operating state of the installation defined by state variables, by determining diagnostic parameters each characterizing one of the state variables. A dependency tree containing at least some of the diagnostic parameters is compiled by configuring the dependency tree with hierarchical levels numbered Hn, where n=1, 2, . . . . The hierarchical levels include a first hierarchical level containing a fault diagnostic parameter characterizing a fault state variable, a second hierarchical level, following the first hierarchical level, and containing diagnostic parameters defining state variables acting directly on the fault state variable, and a hierarchical level Hn+1, following a given hierarchical level Hn, and containing diagnostic parameters defining state variables acting directly on the state variables characterized by the diagnostic parameters at the given hierarchical level Hn. A fault path is established in the dependency tree starting from the fault diagnostic parameter, by identifying a responsible diagnostic parameter at the hierarchical level Hn+1 depending on a magnitude or a change direction of a diagnostic parameter at the given hierarchical level Hn. A cause of the fault is determined from the responsible diagnostic parameter identified in the identifying step at a last one of the hierarchical levels.

The advantages of such a diagnostic system arise in accordance with the above explanations relating to the advantages of the diagnostic method.

Other features which are considered as characteristic for the invention are set forth in the appended claims.

Although the invention is illustrated and described herein as embodied in a method and a system for diagnosing a technical installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
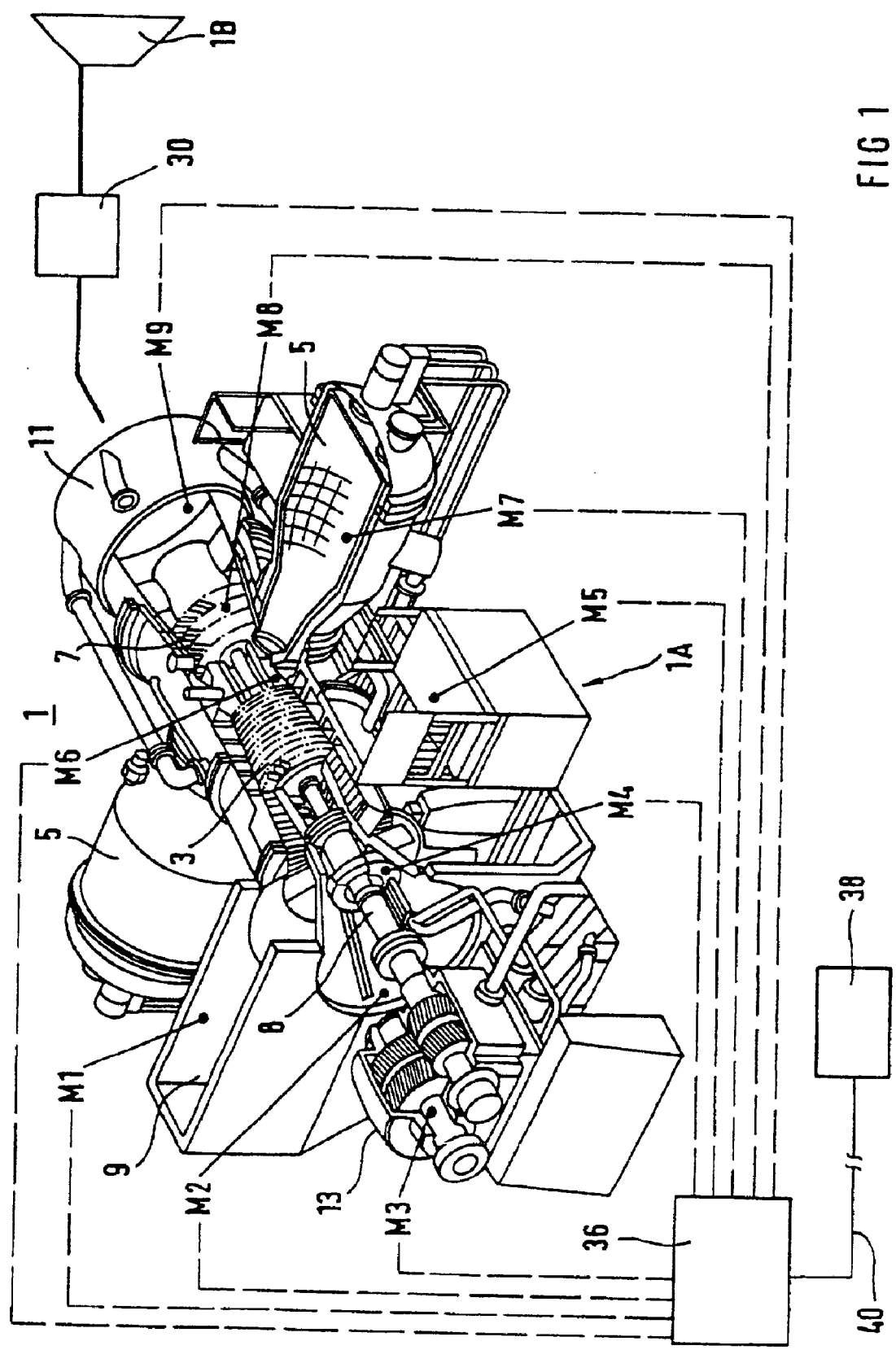
FIG. 1 is a diagrammatic, perspective view of a combined gas and steam turbine installation.

Referring now in detail to the figures of the drawings, in which identical reference symbols have the same meaning, and first, particularly, to FIG. 1 thereof, there is seen a technical installation 1 constructed as a combined gas and steam turbine installation. A gas turbine installation 1A is assembled from a compressor 3, two silo combustion chambers 5 and a turbine part 7. The compressor 3 takes in ambient air through an intake housing 9 and compresses it. The compressed air is supplied to the combustion chambers 5 and burns there with fuel. Hot exhaust gas which is produced in this way drives the turbine part 7 and therefore a turbine shaft 8. The turbine shaft 8 is coupled through a gearbox 13 to a non-illustrated generator in order to generate power. The hot exhaust gas emerges through an outlet diffuser 11 and is routed to a waste-heat boiler 30 to produce steam. The steam which is produced is routed to a steam turbine installation 1B.

Measuring instruments for measuring state variables are disposed at numerous locations in order to monitor the operating state of the turbine installation 1. In the case of the gas turbine installation 1A, these are, for example:

M1: Measurement of external pressure, a pressure difference relating to a filter, ambient temperature and atmospheric humidity in an intake housing;

M2: Measurement of temperature, pressure and position of a first row of guide vanes at a compressor inlet;

M3: Measurement of oscillations, temperature, oil quality, level and pressure in the gearbox;

M4: Measurement of oscillations, temperature and pressure in a bearing;

M5: Measurement of temperature, pressure, level and oil quality in a lubricating oil system;

M6: Measurement of temperature and the pressure at the compressor outlet;

M7: Measurement of pressure and temperature and fuel throughput in a burner or in the combustion chamber;

M8: Measurement of temperature at the turbine outlet; and

M9: Measurement of pollutants, for example BOX, $O_2$, CO in an exhaust gas channel.

The state variables M determined in this way are routed to a transmission device 36. Diagnostic parameters D that characterize the state variables M are routed to a diagnostic system 38 through a wide area network 40, such as the Internet, or through a telephone line.

Figure 2:
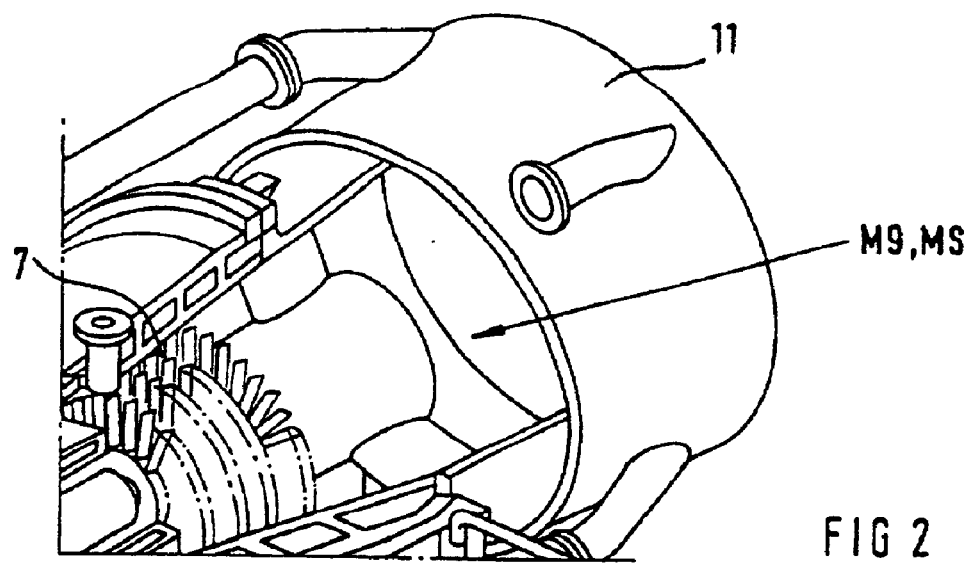
FIG. 2 is an enlarged, fragmentary, perspective view of an outlet area of a gas turbine.

FIG. 2 shows an outlet area with the outlet diffuser 11 of the gas turbine installation 1A of FIG. 1.

Figure 3:
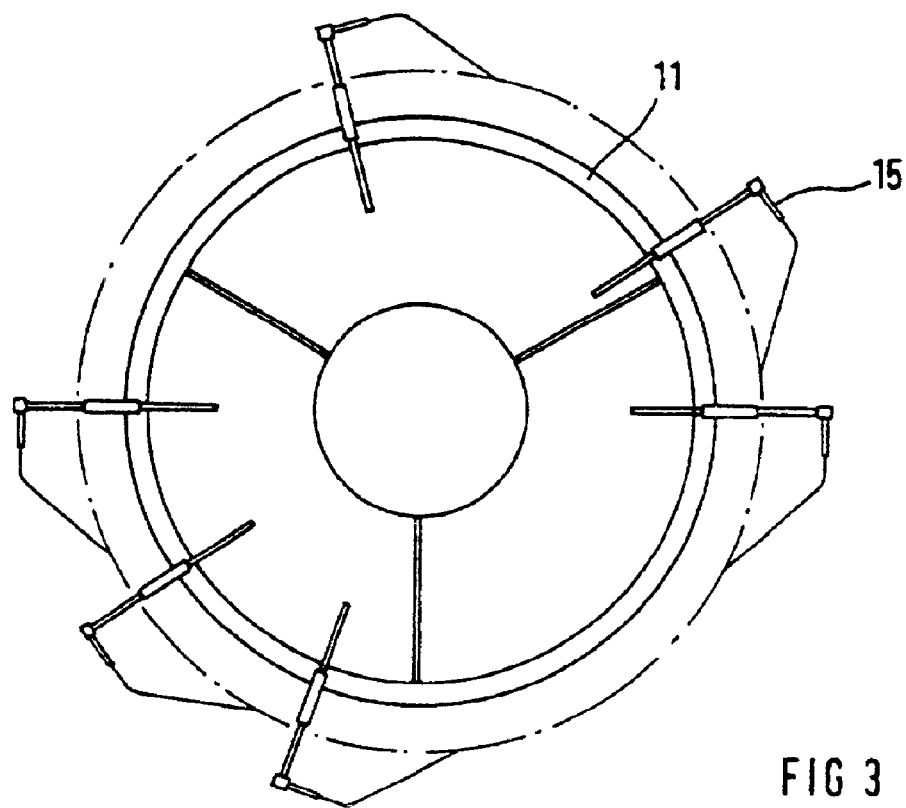
FIG. 3 is a cross-sectional view of an outlet diffuser of a gas turbine with temperature sensors.

FIG. 3 shows a cross section through the outlet diffuser 11 shown in FIG. 2. Temperature sensors 15 are disposed at the outlet diffuser 11 in order to measure an exhaust gas temperature distribution.

Figure 4:
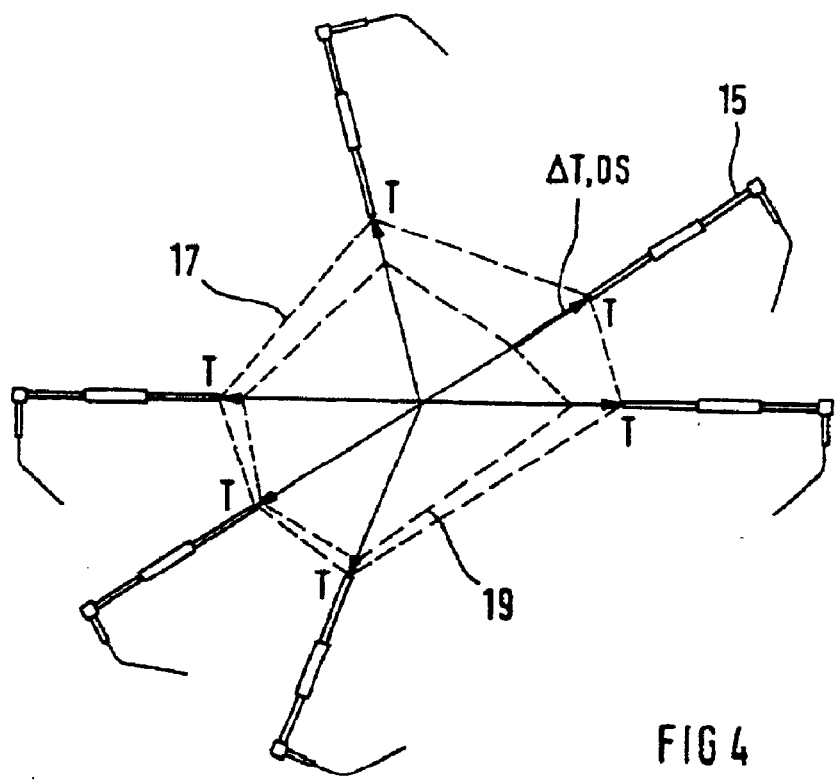
FIG. 4 is a view showing a temperature distribution in an exhaust-gas stream of a gas turbine.

FIG. 4 shows a temperature distribution 19 which is obtained by the temperature sensors 15 and represents the hot exhaust gas. A desired distribution 17 for the temperature distribution is likewise shown. A maximum deviation value between the desired distribution 17 and the temperature distribution 19, which is illustrated as ΔT, results when a fault diagnostic parameter DS exceeds a limiting value.

Figure 5:
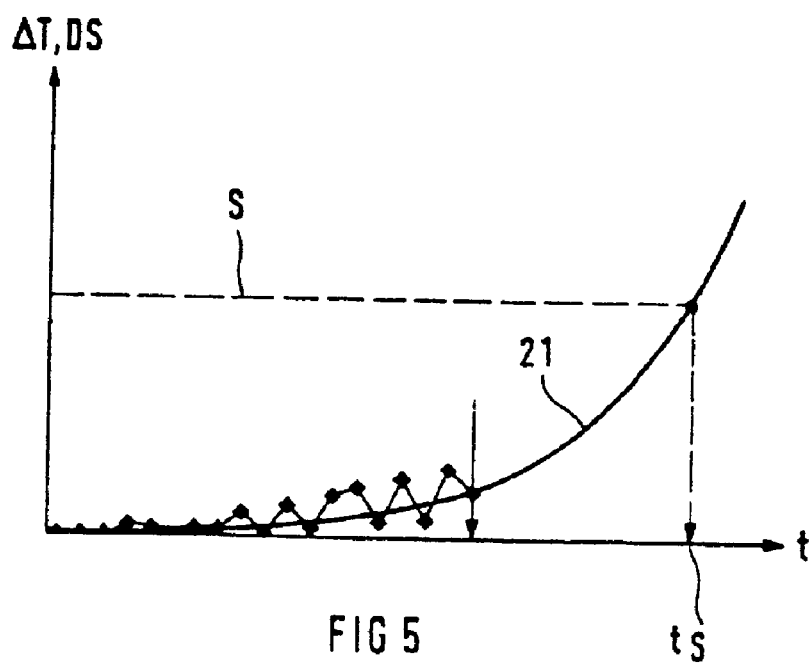
FIG. 5 is a graph of a time curve of a difference between an exhaust-gas temperature and a desired value for exhaust gas of a gas turbine.

FIG. 5 shows a time curve 21 of the temperature difference ΔT and a determined time $t_s$, in which exceeding a limiting value S follows from an extrapolation. A fault event characterized by the fault diagnostic parameter DS can already be made out at an early time through the use of this extrapolation.

Figure 6:
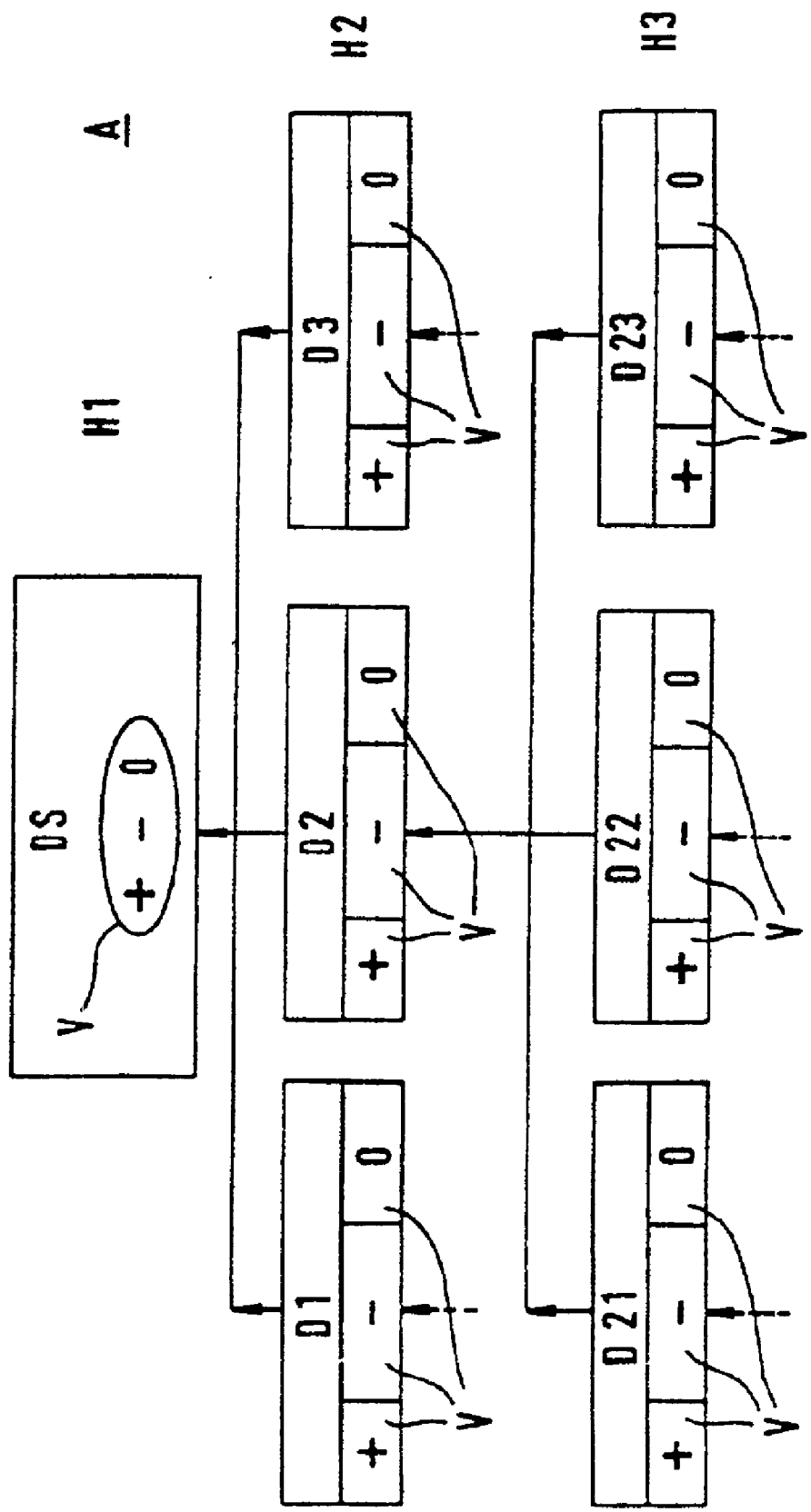
FIG. 6 is a block diagram of a dependency tree A.

A dependency tree A is illustrated in FIG. 6. A first hierarchical level Hi contains a fault diagnostic parameter DS. This fault diagnostic parameter DS can assume a change direction V which is either rising (illustrated with +), falling (illustrated with −) or constant (illustrated with 0). The first hierarchical level H1 is followed by a second hierarchical level H2, which contains diagnostic parameters D1, D2, D3. The diagnostic parameters D1, D2, D3 characterize state variables which act directly on a state variable characterized by the fault diagnostic parameter DS. Each of the diagnostic parameters D1, D2, D3 at the second hierarchical level H2 can exhibit a rising, falling or constant change direction. These change directions are again illustrated by +, − and 0.

The second hierarchical level H2 is followed by a third hierarchical level H3. This third hierarchical level H3 is formed by diagnostic parameters D21, D22 and D23 for the diagnostic parameter D2 at the second hierarchical level H2. The diagnostic parameters D21, D22 and D23 characterize state variables which act directly on the state variable characterized by the diagnostic parameter D2. The diagnostic parameters D21, D22 and D23 also each have a change direction V, which can be rising, falling or constant. The diagnostic parameters D1 and D3 at the second hierarchical level H2 can each have their own third hierarchical level H3 connected downstream. Those respective third hierarchical levels H3 have diagnostic parameters relating to state variables which in turn act directly on the state variables respectively characterized by the diagnostic parameters D1 and D3.

Links between the diagnostic parameters D are introduced on the basis of the change directions V, after compiling the dependency tree A which describes the technological dependencies of the measured state variables. This will be explained in more detail by using FIG. 7.

Figure 7:
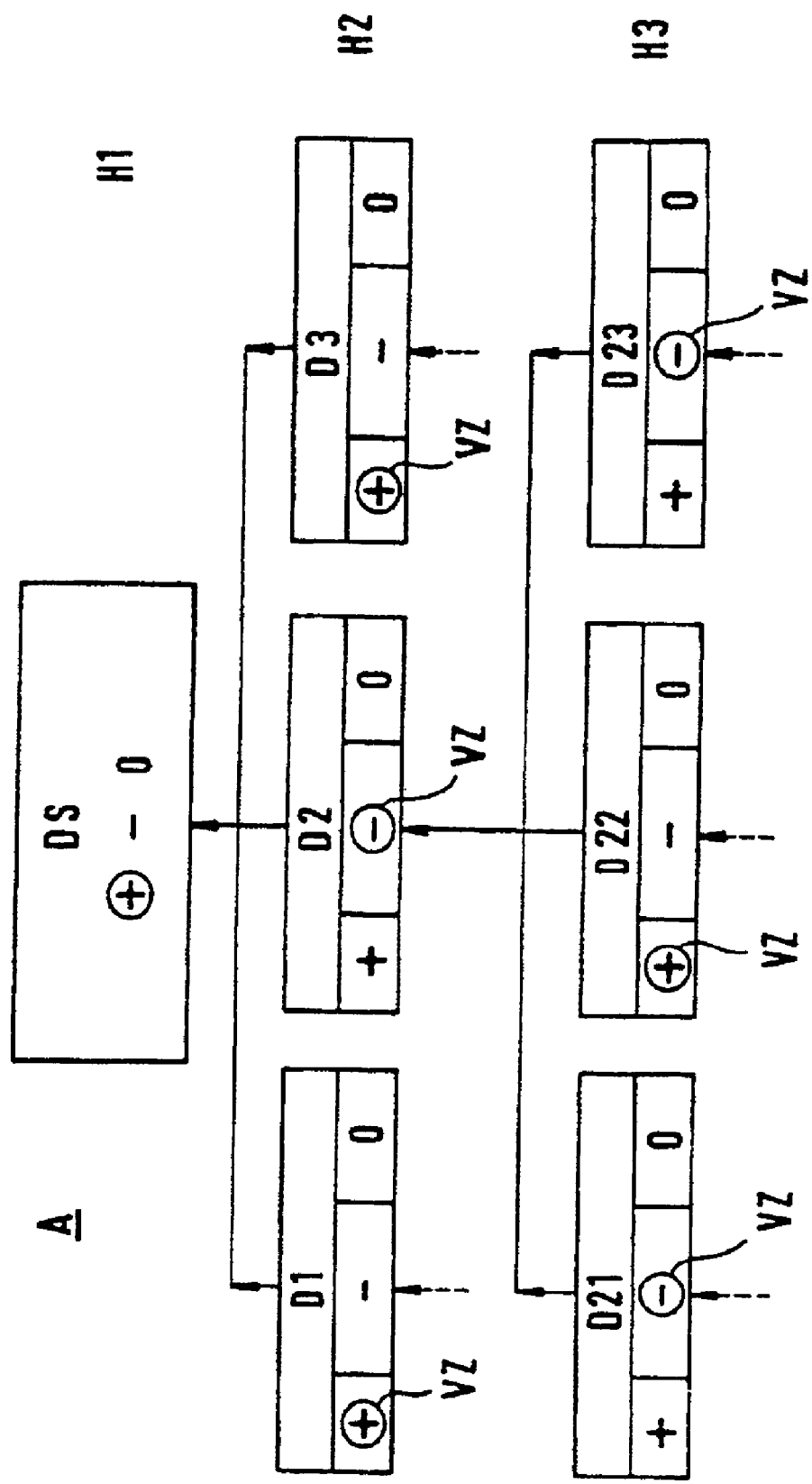
FIG. 7 is a block diagram showing allocated change directions for diagnostic parameters in the dependency tree.

FIG. 7 shows the dependency tree A from FIG. 6, in which a rising change direction, represented by a circle around the plus symbol, is predefined for the fault diagnostic parameter DS as an example. A rising change direction for the fault diagnosis parameter DS can be effected through the use of defined, allocated change directions VZ of the diagnostic parameters D1, D2 and D3 at the second hierarchy level H2. On one hand, a positive change speed VZ is to be allocated to the diagnostic parameter D1 in the illustrated example with the aid of existing knowledge about the state variable dependencies. On the other hand, the diagnostic parameter D2 has a negative allocated change direction VZ. The allocated change direction VZ for the diagnostic parameter D3 is again positive. In other words, the diagnostic parameters D1 and D3 would have to rise in order to also effect an increase in the fault diagnostic parameter DS. By contrast, the diagnostic parameter D2 would have to fall for an increase in the fault diagnostic parameter DS. The diagnostic parameters D21, D22 and D23 are then linked with the diagnostic parameter D2 with respect to the allocated change directions VZ in the same way as the fault diagnostic parameter DS is linked to the diagnostic parameters D1, D2 and D3. A falling diagnostic parameter D21, a rising diagnostic parameter D22 and a falling diagnostic parameter D23 have to be allocated in the case of a falling diagnostic parameter D2. The dependency tree A is then enhanced by expert knowledge about links which reflects the dependencies of the change directions of the diagnostic parameters of the successive hierarchy levels H.

Figure 8:
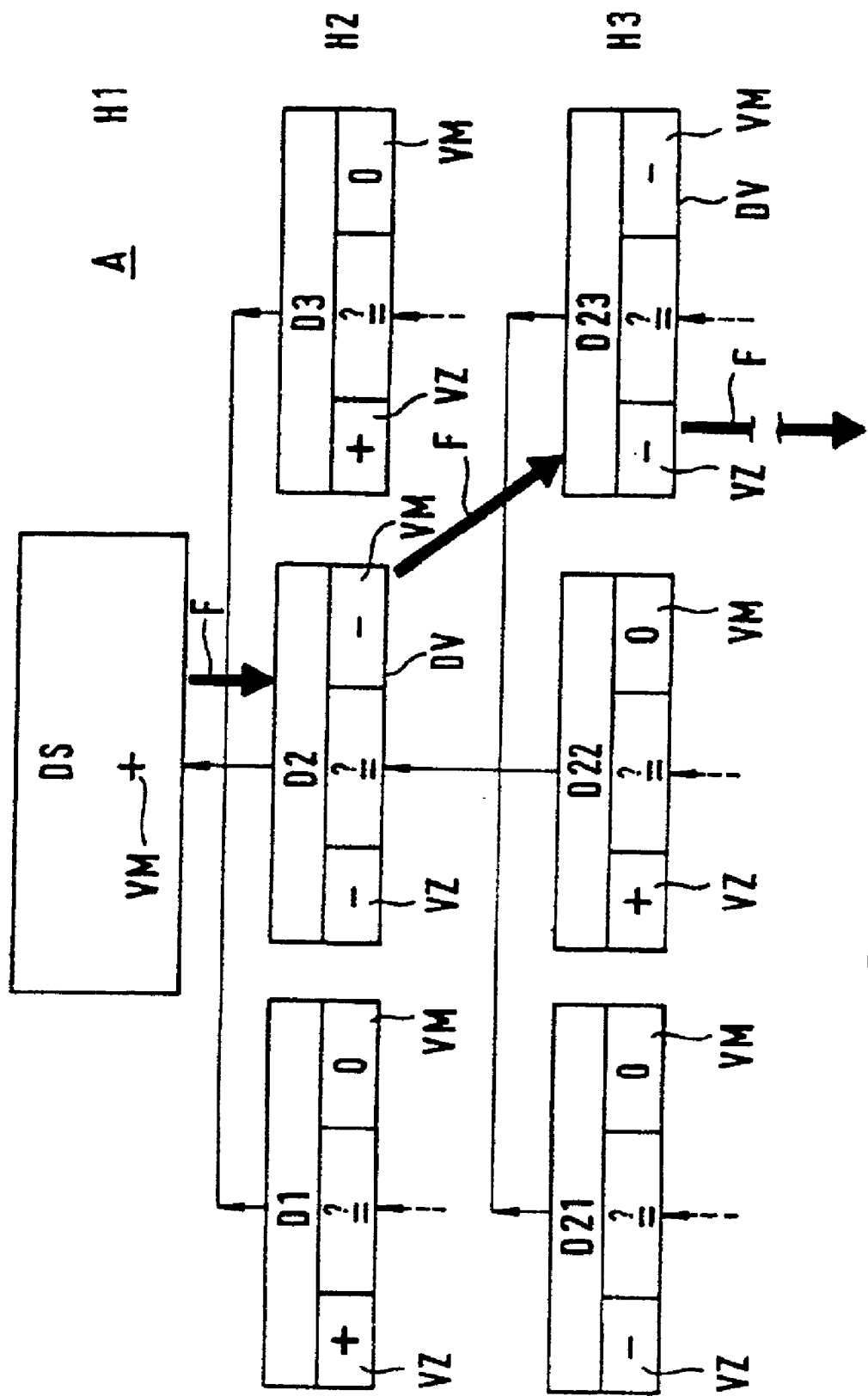
FIG. 8 is a block diagram showing a determination of a fault path in the dependency tree.

FIG. 8 shows how a fault path F is established from the dependency tree of FIG. 7, ultimately leading to the cause of the fault event characterized by the fault diagnostic parameter DS. For instance, the fault event may be characterized by a rising fault diagnostic parameter. A rising fault diagnostic parameter can be caused by a rise in the diagnostic parameter D1, a rise in the diagnostic parameter D3 or a fall in the diagnostic parameter D2. Measured change directions VM of the respective diagnostic parameters D1, D2, D3 are then compared with the change directions VZ of the respective diagnostic parameters D1, D2, D3 that were previously allocated to a rising fault diagnostic parameter DS. An agreement between the allocated change direction VZ and the measured change direction VM leads to an identification of the diagnostic parameter as a diagnostic parameter that is responsible for the rise in the fault diagnostic parameter. In this case, the diagnostic parameter D2 is a responsible diagnostic parameter DV. Accordingly, the diagnostic parameter D23 at the hierarchy level H3 is identified as a responsible diagnostic parameter DV. The connection to the responsible diagnostic parameter, which is started from the fault diagnostic diameter DS, results in the fault path F in the dependency tree A. The fault path F ultimately leads to a last, non-illustrated, hierarchical level H in which the cause of the fault event can be inferred from the responsible diagnostic parameter DV identified there.

One possible fault event in the case of a gas turbine installation could, for example, be a rise in the turbine outlet temperature. The fault diagnostic parameter DS is therefore the turbine outlet temperature, with a rising change direction VM. Its descriptive diagnostic parameters, namely compressor outlet temperature D1, compressor mass flow D2 and fuel mass flow D3, are contained at the first hierarchical level as state variables that act directly on the turbine outlet temperature. In the case of a rise in the turbine outlet temperature, as observed in the fault event, it would be necessary for the compressor outlet temperature to rise. The diagnostic parameter D1 therefore has an allocated change direction VZ that rises for this fault event. The compressor mass flow, that is to say the diagnostic parameter D2, has a falling allocated change direction VZ. The fuel mass flow has no change direction VZ allocated for the fault event, since the fuel mass flow cannot be increased with respect to the steady operating state.

If it is observed that the compressor outlet temperature is constant while the compressor mass flow is falling, then the compressor mass flow, that is to say the diagnostic parameter D2, is identified as a responsible diagnostic parameter DV for the fault event. The rotational speed of the turbine D21, the compressor inlet temperature D22 and the compressor inlet pressure D23 are contained as diagnostic parameters at the third hierarchical level that act on the diagnostic parameter D2. If one observes a constant rotational speed and a constant compressor inlet temperature while the compressor inlet pressure falls, then by comparing the observation with the respectively allocated change directions VZ, the diagnostic parameter D23, that is to say the compressor inlet pressure, is identified as the responsible diagnostic parameter DV. If appropriate, it may be necessary to pass through further hierarchical levels in a corresponding way, in order to finally establish the cause of the increase in the turbine outlet temperature.

The diagnostic method and the diagnostic system described above implement a flexible, reliable and simple tool for establishing the cause of a fault event in a technical installation.

I claim:

1. A diagnostic method for a technical installation for determining a cause of a fault event described by a fault state variable, the method which comprises:
    establishing an operating state of the installation defined by state variables, by determining diagnostic parameters each characterizing one of the state variables;
    compiling a dependency tree containing at least some of the diagnostic parameters by configuring the dependency tree with the following hierarchical levels numbered Hn, where n=1, 2, . . . :
        a first hierarchical level containing a fault diagnostic parameter characterizing a fault state variable,
        a second hierarchical level, following the first hierarchical level, and containing diagnostic parameters defining state variables acting directly on the fault state variable,
        a hierarchical level Hn+1, following a given hierarchical level Hn, and containing diagnostic parameters defining state variables acting directly on the state variables characterized by the diagnostic parameters at the given hierarchical level Hn;
    determining a fault path in the dependency tree starting from the fault diagnostic parameter, by identifying a responsible diagnostic parameter at the hierarchical level Hn+1 depending on one of a magnitude or a change direction of a diagnostic parameter at the given hierarchical level Hn;
    inferring a cause of the fault from the responsible diagnostic parameter identified in the identifying step at a last one of the hierarchical levels; and
    allocating one of a rising, a falling or a constant change direction to each diagnostic parameter at the hierarchical level Hn+1, for each diagnostic parameter at the given hierarchical level Hn, as a function of a redefined change direction of the respective diagnostic parameter at the given hierarchical level Hn, and establishing the fault path by agreement between measured change directions of the diagnostic parameters and the allocated change directions.

2. The diagnostic method according to claim 1, wherein the technical installation is a turbine installation.

3. The diagnostic method according to claim 2, wherein the turbine installation is a gas turbine installation.

4. The diagnostic method according to claim 2, wherein the turbine installation is a steam turbine installation.

5. The diagnostic method according to claim 2, wherein the turbine installation is a combined gas and steam turbine installation.

6. The diagnostic method according to claim 1, which further comprises establishing the cause by utilizing a wide area network.

7. The diagnostic method according to claim 1, which further comprises establishing the cause by utilizing the Internet.

8. A diagnostic system for a technical installation for determining a cause of a fault event described by a fault state variable, the diagnostic system configured to:
    establish an operating state of the installation defined by state variables, by determining diagnostic parameters each characterizing one of the state variables;
    compile a dependency tree containing at least some of the diagnostic parameters by configuring the dependency tree with the following hierarchical levels numbered Hn, where n=1, 2, . . . :
  a first hierarchical level containing a fault diagnostic parameter characterizing a fault state variable,
  a second hierarchical level, following the first hierarchical level, and containing diagnostic parameters defining state variables acting directly on the fault state variable,
  a hierarchical level Hn+1, following a given hierarchical level Hn, and containing diagnostic parameters defining state variables acting directly on the state variables characterized by the diagnostic parameters at the given hierarchical level Hn;
establish a fault path in the dependency tree starting from the fault diagnostic parameter, by identifying a responsible diagnostic parameter at the hierarchical level Hn+1 depending on one of a magnitude or a change direction of a diagnostic parameter at the given hierarchical level Hn;
determine a cause of the fault from the responsible diagnostic parameter identified in the identifying step at a last one of the hierarchical levels; and
allocate one of a rising, a falling or a constant change direction to each diagnostic parameter at the hierarchical level Hn1, for each diagnostic parameter at the given hierarchical level Hn, as a function of a predefined change direction of the respective diagnostic parameter at the given hierarchical level Hn, and establish the fault path by agreement between measured change directions of the diagnostic parameters and the allocated change directions.

9. A diagnostic system for a technical installation for determining a cause of a fault event described by a fault state variable, the diagnostic system comprising:
  means for establishing an operating state of the installation defined by state variables, by determining diagnostic parameters each characterizing one of the state variables;
  means for compiling a dependency tree containing at least some of the diagnostic parameters by configuring the dependency tree with the following hierarchical levels numbered Hn, where n=1, 2, . . . :
    a first hierarchical level containing a fault diagnostic parameter characterizing a fault state variable,
    a second hierarchical level, following the first hierarchical level, and containing diagnostic parameters defining state variables acting directly on the fault state variable,
    a hierarchical level Hn+1, following a given hierarchical level Hn, and containing diagnostic parameters defining state variables acting directly on the state variables characterized by the diagnostic parameters at the given hierarchical level Hn;
  means for establishing a fault path in the dependency tree starting from the fault diagnostic parameter, by identifying a responsible diagnostic parameter at the hierarchical level Hn+1 depending on one of a magnitude or a change direction of a diagnostic parameter at the given hierarchical level Hn;
  means for determining a cause of the fault from the responsible diagnostic parameter identified in the identifying step at a last one of the hierarchical levels; and
  means for allocating one of a rising, a falling or a constant change direction to each diagnostic parameter at the hierarchical level Hn+1, for each diagnostic parameter at the given hierarchical level Hn, as a function of a predefined change direction of the respective diagnostic parameter at the given hierarchical level Hn, and establishing the fault path by agreement between measured change directions of the diagnostic parameters and the allocated change directions.

* * * * *